(12) United States Patent
Gherardi et al.

(10) Patent No.: US 10,351,003 B2
(45) Date of Patent: Jul. 16, 2019

(54) ELECTRIC MOTORCYCLE WITH WHEEL ANTI-LOCK SYSTEM

(71) Applicant: Energica Motor Company S.p.A., Modena (IT)

(72) Inventors: Giovanni Gherardi, Modena (IT); Giampiero Testoni, Modena (IT); Simone Martinelli, Modena (IT); Eleonora Montanari, Modena (IT)

(73) Assignee: Energica Motor Company S.p.A., Modena (IT)

( * ) Notice: Subject to any disclaimer, the term of this patent is extended or adjusted under 35 U.S.C. 154(b) by 20 days.

(21) Appl. No.: 15/555,551

(22) PCT Filed: Mar. 7, 2016

(86) PCT No.: PCT/IB2016/051277
§ 371 (c)(1),
(2) Date: Sep. 5, 2017

(87) PCT Pub. No.: WO2016/139648
PCT Pub. Date: Sep. 9, 2016

(65) Prior Publication Data
US 2018/0050593 A1 Feb. 22, 2018

(30) Foreign Application Priority Data

Mar. 5, 2015 (IT) .............................. MO2015A0047

(51) Int. Cl.
*B60L 3/10* (2006.01)
*B60L 7/14* (2006.01)
(Continued)

(52) U.S. Cl.
CPC ................. *B60L 3/108* (2013.01); *B60L 7/14* (2013.01); *B60L 7/16* (2013.01); *B60L 7/18* (2013.01);
(Continued)

(58) Field of Classification Search
CPC .... B60L 3/108; B60L 7/14; B60L 7/16; B60L 7/18; B60L 15/2009
(Continued)

(56) References Cited

U.S. PATENT DOCUMENTS 5,472,265 A 12/1995 Ohnuma
5,615,933 A 4/1997 Kidston et al.
(Continued)

FOREIGN PATENT DOCUMENTS

EP 2823985 1/2015

OTHER PUBLICATIONS

International Search Report and the Written Opinion dated Jun. 29, 2016 From the International Searching Authority Re. Application No. PCT/IB2016/051277. (13 Pages).

*Primary Examiner* — Yazan A Soofi

(57) ABSTRACT

The electric motorcycle (M) comprises a support frame, a rear wheel (RW), a front wheel (FW), an electric propulsion motor (E), an electronic control unit (2) for driving the electric motor (E) and a wheel anti-lock system (1) operatively connected to the control unit (2), the system (1) having detection means (18) of a slippage condition (SLP) of at least one of the wheels (RW, FW) and limiting means (19) operatively connected to the detecting means (18), able to receive at input at least a maximum regeneration torque value ($RT_{MAX}$) of the electric motor (E) of the electric motorcycle (M) and able to limit the maximum regeneration torque ($RT_{MAX}$) in case of detection of the slippage condition (SLP), wherein the system (1) comprises verification means (20) of the friction conditions of the wheels (RW, FW) on the road surface, in order to verify the presence or not of a high friction condition (HIGH_MU) or a low friction condition (LOW_MU), wherein the limiting means (19) are operatively connected to the verification means (20) and, in case of detection of the slippage condition (SLP), are able to limit
(Continued)

the maximum regeneration torque ($RT_{MAX}$) according to the high friction (HIGH_MU) or low friction (LOW_MU) condition, and wherein the verification means (20) of the friction conditions comprise:

- a first detection unit (35) able to detect the high friction condition (HIGH_MU) according to at least an acceleration value (AV_ACC), a pressure value (P1) of a front brake of the electric motorcycle (M) and an instantaneous torque value (T_IN) of the electric motor (E);
- a second detection unit (36) able to detect the low friction condition (LOW_MU) according to at least a pressure value (P1) of a front brake of the electric motorcycle (M) and an instantaneous torque value (T_IN) of the electric motor (E)-.

14 Claims, 8 Drawing Sheets

(51) Int. Cl.
*B60L 7/16* (2006.01)
*B60L 7/18* (2006.01)
*B60L 15/20* (2006.01)

(52) U.S. Cl.
CPC ....... *B60L 15/2009* (2013.01); *B60L 2200/12* (2013.01); *B60L 2240/12* (2013.01); *B60L 2240/461* (2013.01); *Y02T 10/645* (2013.01); *Y02T 10/72* (2013.01); *Y02T 10/7275* (2013.01)

(58) Field of Classification Search
USPC .......................................................... 701/22
See application file for complete search history.

(56) References Cited

U.S. PATENT DOCUMENTS

| | | | |
|---|---|---|---|
| 8,922,035 B2 * | 12/2014 | Matsuda | B62M 23/02 290/400 |
| 2012/0138375 A1 * | 6/2012 | Hughes | B60L 7/10 180/65.1 |
| 2013/0030649 A1 * | 1/2013 | Matsuda | B60T 8/1706 701/38 |
| 2013/0147417 A1 * | 6/2013 | Kim | H02P 21/0003 318/722 |
| 2013/0270025 A1 * | 10/2013 | Matsuda | B62K 11/04 180/220 |
| 2013/0270938 A1 * | 10/2013 | Matsuda | B60K 1/00 310/54 |
| 2014/0277983 A1 | 9/2014 | Bayar et al. | |
| 2015/0274019 A1 * | 10/2015 | Matsuda | B62K 11/04 701/22 |
| 2015/0274020 A1 * | 10/2015 | Matsuda | B60L 7/14 701/70 |
| 2015/0367907 A1 * | 12/2015 | Bland | B62M 7/02 180/216 |
| 2016/0304151 A1 * | 10/2016 | Di Benedetto | B62M 7/12 |

\* cited by examiner

ELECTRIC MOTORCYCLE WITH WHEEL ANTI-LOCK SYSTEM

RELATED APPLICATIONS

This application is a National Phase of PCT Patent Application No. PCT/IB2016/051277 having International filing date of Mar. 7, 2016, which claims the benefit of priority of Italian Patent Application No. MO2015A000047, filed on Mar. 5, 2015. The contents of the above applications are all incorporated by reference as if fully set forth herein in their entirety.

FIELD AND BACKGROUND OF THE INVENTION

The present invention relates to an electric motorcycle with wheel anti-lock system.

The use is known and more and more common of electrically-propelled motorcycles. Electric motorcycles of known type comprise an electric motor, typically consisting of a single-phase AC motor or of a brushless motor, a rechargeable electric battery and an inverter connected to the electric battery and able to control the electric motor.

In practice, the inverter receives a signal from the throttle grip of the electric motorcycle, and converts this received signal into a corresponding supply current/voltage of the electric motor.

Therefore, during this phase of power supply to the electric motor, the inverter draws a predetermined current from the electric battery and appropriately converts it into power supplied to the electric motor.

Furthermore, electric motorcycles of known type can be provided with a regenerating system, i.e., a system capable of recovering energy during deceleration/braking of the motorcycle in order to use it for recharging the electric battery.

Consequently, when slowing down and/or braking the recovered energy translates into a current sent to the electric motorcycle battery, to recharge the battery itself.

Nevertheless, the known type of electric propulsion systems requires a number of solutions. In particular, it is known that the wheel anti-lock systems (ABS—Antilock Braking System) of conventional type are difficult to fit on electrically-propelled motor vehicles.

In fact, the known type of anti-lock braking systems are not able to handle all those driving situations wherein the locking of the drive wheel is caused by the deceleration of the motor vehicle due to the braking action of the electric motor, i.e., during the battery regeneration phase, when use is made of the energy recovered to charge the electric battery.

For example, in case of the locking of the wheel of the motor vehicle caused exclusively by the braking action of the electric motor, an anti-lock system of conventional type would operate directly on the brakes of the motor vehicle so as to decrease the braking force. However, not only would such operation of the anti-lock system not allow the release of the wheel, but would also risk impairing a subsequent operation of the brakes controlled by the rider.

The document US 2012/138375 A1 describes a wheel anti-lock system for electric motorcycles.

Nevertheless, such known system does not allow effectively preventing the wheels of an electric motorcycle from locking even after vehicle deceleration caused by the braking action of the electric motor of the motorcycle, during an electric battery regeneration phase.

SUMMARY OF THE INVENTION

The main aim of the present invention is to provide an electric motorcycle with a wheel anti-lock system which allows to avoid the locking of the wheels even after deceleration of the motorcycle caused by the braking action of the electric motor, during an electric battery regeneration phase.

Another object of the present invention is to provide an electric motorcycle with a wheel anti-lock system which allows to overcome the mentioned drawbacks of the prior art within the ambit of a simple, rational, easy and effective to use as well as affordable solution.

The above mentioned objects are achieved by this electric motorcycle with a wheel anti-lock system, having the characteristics of claim 1.

BRIEF DESCRIPTION OF THE SEVERAL VIEWS OF THE DRAWINGS

Other characteristics and advantages of the present invention will become better apparent from the description of a preferred, but not exclusive, embodiment of an electric motorcycle with a wheel anti-lock system, illustrated by way of an indicative, but non-limiting, example in the accompanying drawings, wherein.

DESCRIPTION OF SPECIFIC EMBODIMENTS OF THE INVENTION

With particular reference to such Figures, reference number 1 globally indicates a wheel anti-lock system usable in particular on an electric motorcycle M or a similar electrically-propelled vehicle.

Figure 1:
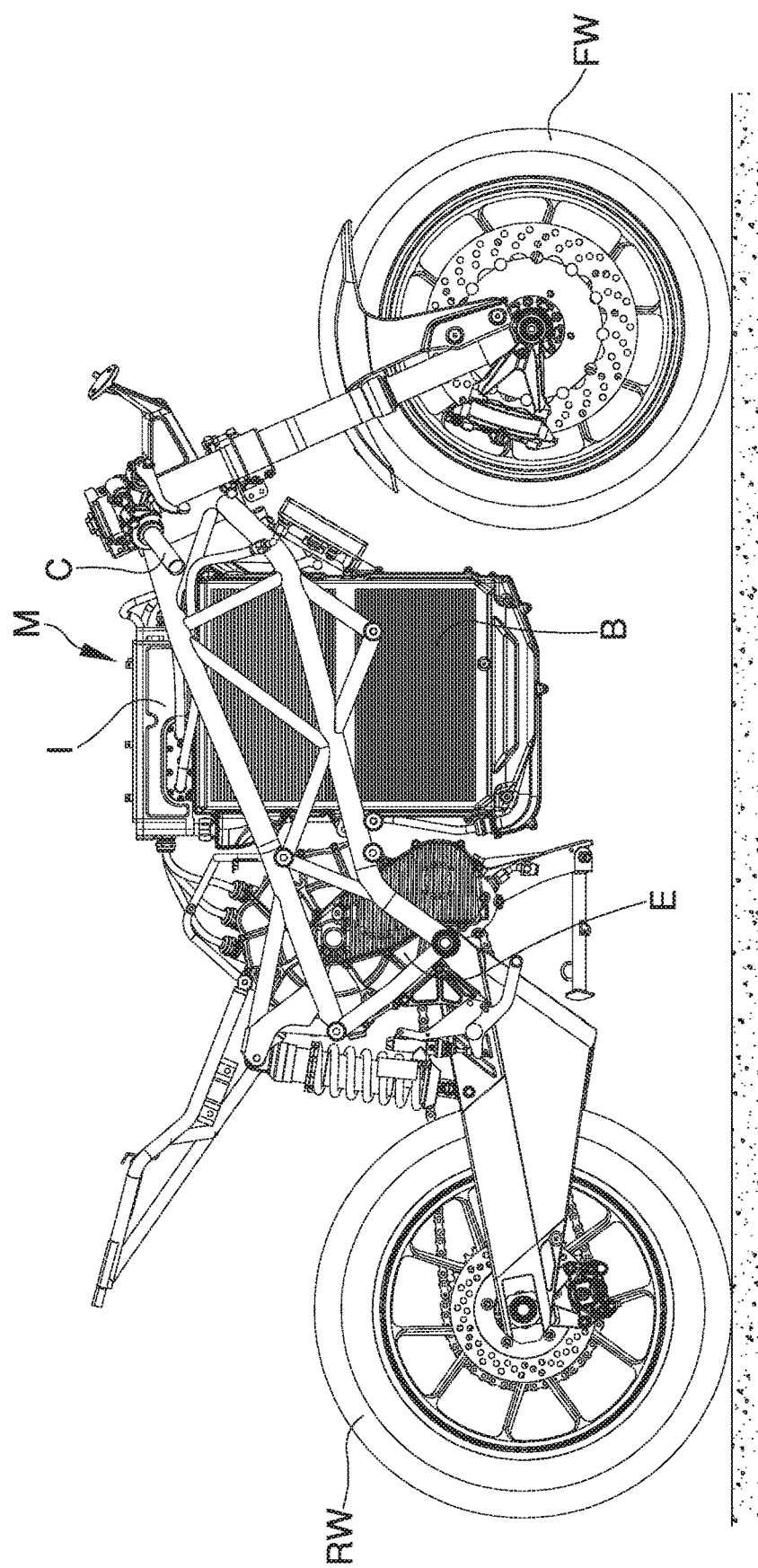
FIG. 1 is a side view of a possible electric motorcycle according to the invention.

As schematically shown in FIG. 1, the electric motorcycle M comprises a support frame, a rear wheel RW, a front wheel FW, an electric propulsion motor E, an electronic control unit 2 for driving the electric motor E and a wheel anti-lock system 1 operatively connected to the control unit 2.

The system 1 is implemented by means of a plurality of hardware and/or software components suitably interfaced with one another.

Figure 2:
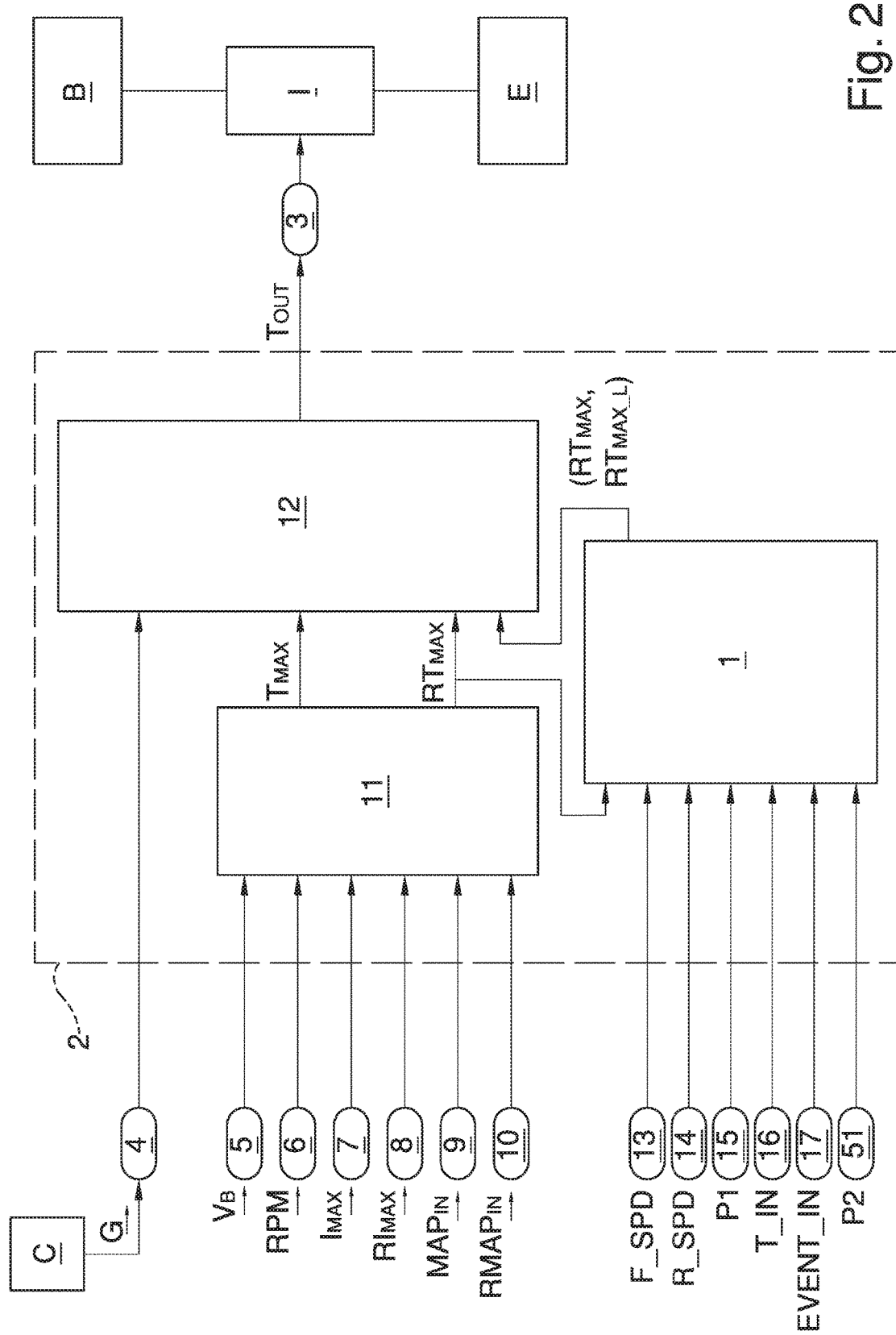
FIG. 2 is a general block diagram that illustrates the wheel anti-lock system and the driving control unit of the electric motorcycle according to the invention.

As shown by way of example in FIG. 2, the system 1 can be implemented inside an electronic control unit 2 for driving an electric motor E for the propulsion of an electric motorcycle M.

For example, the control unit 2 can be of the type described in the Italian patent application no. MO2014A000307. The implementation of the system 1 cannot however be ruled out within different systems and appliances for driving the electric motor of electric motorcycles.

Still with reference to the example shown in FIG. 2, the control unit 2 comprises an output 3 connectable to an inverter I controlling an electric motor E of the electric motorcycle M.

The output 2 is able to send to the inverter I a driving signal $T_{OUT}$.

The inverter I may consist of an inverter of the conventional type connected to a rechargeable electric battery B of the electric motorcycle M and able to control the electric motor E according to the driving signal $T_{OUT}$.

In particular, the driving signal $T_{OUT}$ sent to the inverter I corresponds to a torque value delivered by the electric motor E.

The control unit 2 can be used both during an active operating phase and during a phase of regeneration of the electric battery B. In particular, during the active operating phase, the inverter I takes a predetermined electric current from the electric battery B and converts it appropriately into power supplied to the electric motor E. During the regeneration phase (generally during deceleration and/or braking of the electric motorcycle M) the recovered energy translates into a current supplied by the inverter I to the electric battery B, to recharge the battery itself.

The control unit 2 comprises a first input 4 connectable to a control device C of the acceleration of the electric motorcycle M, consisting of the throttle grip. The first input 4 is able to receive a command signal G coming from the electronics of the knob C and correlated to the angular position of the knob itself.

The control unit 2 comprises a second input 5 able to receive an output voltage value $V_B$ of the electric battery B. More specifically, such output voltage $V_B$ can vary according to the conditions of use and temperature of the electric battery B.

The control unit 2 comprises, furthermore, a third input 6 able to receive an RPM rotation speed value of the electric motor E.

The control unit 2 further comprises:
 a fourth input 7 able to receive a dynamic value of maximum deliverable current $I_{MAX}$;
 a fifth input 8 able to receive a dynamic value of the maximum absorbable current $RI_{MAX}$.

In particular, such dynamic values $I_{MAX}$ and $RI_{MAX}$ represent the maximum deliverable current that can be delivered and the maximum absorbable current that can be absorbed respectively by the electric battery B, and can be calculated e.g. by a BMS-type (Battery Monitoring System) system or similar system fitted on the electric motorcycle M, according to the temperature and/or the charge level of the electric battery B.

The control unit 2 can comprise a sixth input 9 and a seventh input 10 able to receive the signals for selecting the delivery/regeneration modes $Map_{IN}$, $RMap_{IN}$ able to select the different operating modes of the electric motorcycle M during the active phase or during the regeneration phase, respectively.

The control unit 2 is capable to perform the dynamic generation of the delivered torque value $T_{OUT}$ sent to the inverter I.

In particular, during the active phase, the control unit 2 dynamically generates the delivered torque value $T_{OUT}$ according to the command signal G coming from the knob C and to a maximum deliverable current value $I_{MAX}$ of the electric battery B of the electric motorcycle M.

Similarly, during the regeneration phase, the control unit 2 dynamically generates the delivered torque value $T_{OUT}$ according to the command signal G coming from the knob C and to the maximum absorbable current value $RI_{MAX}$ of the electric battery B of the electric motorcycle M.

The control unit 2 comprises a first calculation unit 11 able to calculate a maximum deliverable torque value $T_{MAX}$ according to the maximum deliverable current value $I_{MAX}$, to the output voltage value $V_B$ and to the RPM rotation speed value.

Similarly, the first calculation unit 11 is able to calculate a maximum regeneration torque value $RT_{MAX}$ according to the maximum absorbable current value $RI_{MAX}$, to the output voltage value $V_B$ and to the RPM rotation speed value.

Furthermore, the control unit 2 comprises a second calculation unit 12 able to calculate the delivered torque value $T_{OUT}$ to be sent to the inverter I according to the maximum deliverable torque value $T_{MAX}$, to the maximum regeneration torque value $RT_{MAX}$ and to the command signal G.

Preferably, the delivered torque value $T_{OUT}$ varies between a maximum value equal to the maximum deliverable torque value $T_{MAX}$ and a minimum value equal to the maximum regeneration torque value $RT_{MAX}$, while all the intermediate values are appropriately determined.

For example, the command signal G may consist of a signal variable between 0 and 1, where zero corresponds to the minimum rotation angle of the throttle grip C, while 1 corresponds to the maximum rotation angle of the throttle grip C.

Preferably, the wheel anti-lock system 1 of the electric motorcycle M is interposed between the first calculation unit 11 and the second calculation unit 12 and is able to receive at input the maximum regeneration torque value $RT_{MAX}$ and to return at output the same maximum regeneration torque value $RT_{MAX}$ or a maximum limited torque value $RT_{MAX\_L}$, according to whether or not a slippage condition SLP occurs of the front and rear wheels RW, FW of the electric motorcycle M.

The system 1 also comprises:
 a first input 13 able to receive an instantaneous speed value F_SPD of the front wheel FW;
 a second input 14 able to receive an instantaneous speed value R_SPD of the rear wheel RW;
 a third input 15 able to receive a pressure value P1 of the front brake (in bar);
 a fourth input 16 able to receive an instantaneous torque value T_IN of the electric motor E to the wheel RW;
 a fifth input 17 able to receive a wheel locking signal EVENT_IN coming from a conventional ABS system fitted on the electric motorcycle M.

Preferably, the system 1 also comprises a sixth input 51 able to receive a pressure value P2 of the rear brake (in bar).

A possible embodiment of the wheel anti-lock system 1 is illustrated in detail in FIG. 3 and is described below.

In particular, the system 1 comprises detecting means 18 able to detect a slippage condition SLP of at least one of the wheels FW and RW of the electric motorcycle M.

Advantageously, moreover, the system 1 comprises limiting means 19 operatively connected to the detecting means 18 and able to limit the maximum regeneration torque $RT_{MAX}$ of the electric motor E of the electric motorcycle M in the event of detection of the slippage condition SLP.

Preferably, moreover, the system 1 has verification means 20 of the friction conditions of the wheels RW, FW of the electric motorcycle M on the road surface.

In particular, such verification means 20 are able to verify the presence or not of a high friction condition HIGH_MU or of a low friction condition LOW_MU.

Advantageously, therefore, the limiting means 19 are operatively connected to the verification means 20 and, in case of detection of the slippage condition SLP, they are able to limit the maximum regeneration torque $RT_{MAX}$ according to the high friction condition HIGH_MU or to the low friction condition LOW_MU detected.

Figure 3:
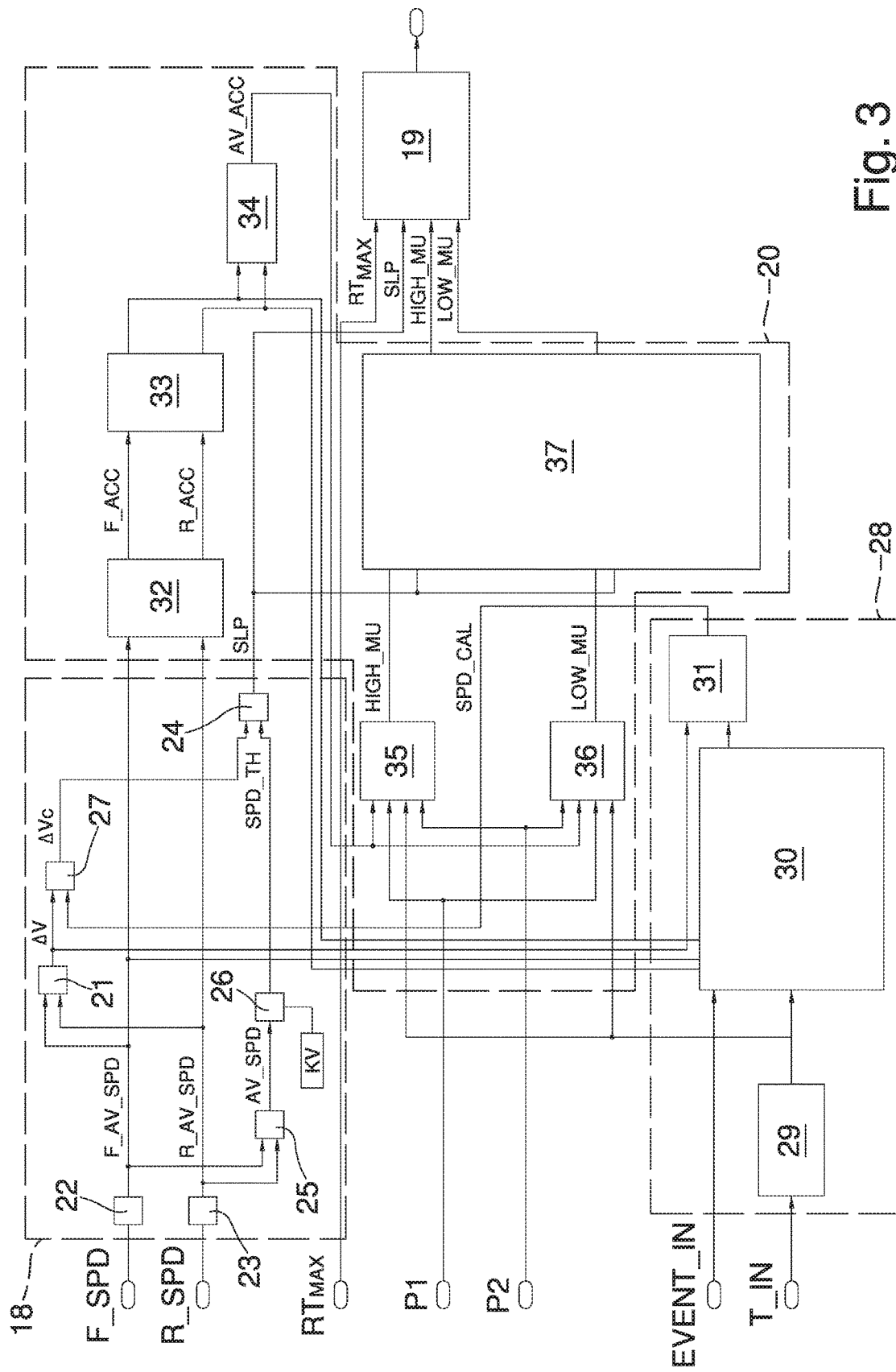
FIG. 3 is a block diagram that illustrates a possible embodiment of the wheel anti-lock system of the electric motorcycle according to the invention.

With reference to the preferred embodiment shown in FIG. 3, the detecting means 18 comprise a first calculation unit 21, made up e.g. of a subtraction element (hardware circuit or software component), able to calculate the speed difference ΔV between the front wheel FW and the rear wheel RW starting from at least an instantaneous speed value F_SPD of the front wheel FW and from at least an instantaneous speed value R_SPD of the rear wheel RW.

Preferably, the detecting means 18 provide for:
a second calculation unit 22, made up e.g. of a mediator element (hardware circuit or software component), able to calculate an average speed value F_AV_SPD of the front wheel FW starting from a plurality of instantaneous speed values F_SPD;
a third calculation unit 23, made up e.g. of a mediator element (hardware circuit or software component), able to calculate an average speed value R_AV_SPD of the rear wheel RW starting from a plurality of instantaneous speed values R_SPD.

Usefully, therefore, the first calculation unit 21 determines the speed difference ΔV as the difference between the average speed value F_AV_SPD and the average speed value R_AV_SPD.

For example, these average speed values F_AV_SPD and R_AV_SPD can be calculated considering two instantaneous speed values F_SPD and R_SPD consecutive the one to the other. This way any speed peaks can be eliminated.

Advantageously, moreover, the detecting means 18 comprise a comparison unit 24 for comparing the speed difference ΔV and a predefined threshold value SPD_TH, wherein:
if said speed difference is greater than (or equal to) said threshold value SPD_TH, then said slippage condition SLP is present;
if said speed difference is less than said threshold value SPD_TH, then said slippage condition SLP is absent.

Preferably, the detecting means 18 comprise calculation means 25, 26 of the threshold value SPD_TH according to the average speed of the front wheel F_AV_SPD and to the average speed of the rear wheel R_AV_SPD.

In particular, such calculation means 25, 26 comprise at least a fourth calculation unit 25 able to calculate the average speed AV_SPD of the electric motorcycle M as average between the average speed of the front wheel AV_F_SPD and the average speed of the rear wheel AV_R_SPD.

In addition, the calculation means 25, 26 comprise a fifth calculation unit 26 able to multiply the average speed value AV_SPD determined by a predefined proportionality coefficient KV.

Consequently, the threshold value SPD_TH so determined corresponds to a predefined percentage of the calculated average speed AV_SPD.

For example, the calculated threshold value SPD_TH may correspond to 4% of the average speed value AV_SPD of the electric motorcycle M.

Usefully, the detecting means 18 comprise a calibration means 27 operatively interposed between the first calculation unit 21 and the comparison unit 24, able to receive at input the speed difference ΔV and a calibration value SPD_CAL and able to return at output a calibrated speed difference value $ΔV_C$.

In particular, the system 1 can have determination means 28 for determining the calibration value SPD_CAL according to the instantaneous torque value T_IN of the electric motor E to the drive wheel (e.g., the rear wheel RW) of the electric motorcycle.

Furthermore, the determination means 28 can receive at input the wheel locking signal EVENT_IN coming from a conventional ABS system.

In particular, the determination means 28 can comprise a sixth calculation unit 29, made up e.g. of a mediator element, able to calculate an average torque value starting from a plurality of instantaneous torque values T_IN.

The determination means 28 also have a verification block 30, connected to the output of the sixth calculation unit 29, able to check the riding conditions of the electric motorcycle M.

In particular, the verification block 30 is able to verify the presence or absence of a stationary riding condition or of a critical riding condition by comparing different detected values relating to the current riding state of the electric motorcycle M with a series of predefined parameters. For example, these predefined parameters may comprise predetermined threshold values relating to the delivered torque and to the pressure in the brake cylinder.

A calculation block 31 of the calibration value SPD_CAL has its input connected to the verification block 30 and to the first calculation unit 21 and is connected at output to the calibration unit 27. The calculation block 31 is able to calculate the calibration value SPD_CAL according to a plurality of speed difference values ΔV calculated at different moments and in the presence of a stationary riding condition.

Still in FIG. 2 a possible embodiment of the verification means 20 of the friction conditions is illustrated in detail.

In particular, the verification means 20 comprise a derivation unit 32 able to calculate an acceleration value F_ACC of the front wheel FW and an acceleration value R_ACC of the rear wheel RW according to the average speed values F_AV_SPD and R_AV_SPD, respectively.

Usefully, the verification means 20 comprise a conversion unit 33 connected downstream of the derivation unit 32 and able to perform a conversion of the unit of measurement of the acceleration values F_ACC and R_ACC from (km/h)/s to $m/s^2$.

Furthermore, the verification means 20 have a determination unit 34 connected downstream of the conversion unit 33 and able to determine an average acceleration value AV_ACC of the electric motorcycle M starting from the acceleration values F_ACC and R_ACC of the front wheel FW and of the rear wheel FW.

Alternative embodiments cannot however be ruled out wherein the acceleration value of the electric motorcycle M is determined by means of an accelerometer fitted on board the motorcycle itself.

Advantageously, the verification means 20 comprise a first detecting unit 35 able to detect a high friction condition HIGH_MU according to the average acceleration value AV_ACC, to the pressure value P1 of the front brake of the electric motorcycle M and to the instantaneous torque value T_IN.

Preferably, the first detecting unit 35 is able to also detect such high friction condition HIGH_MU according to the pressure value P2 of the rear brake of the electric motorcycle M. In particular, this way it is possible to obtain a more effective detection of the high friction condition HIGH_MU.

Figure 4:
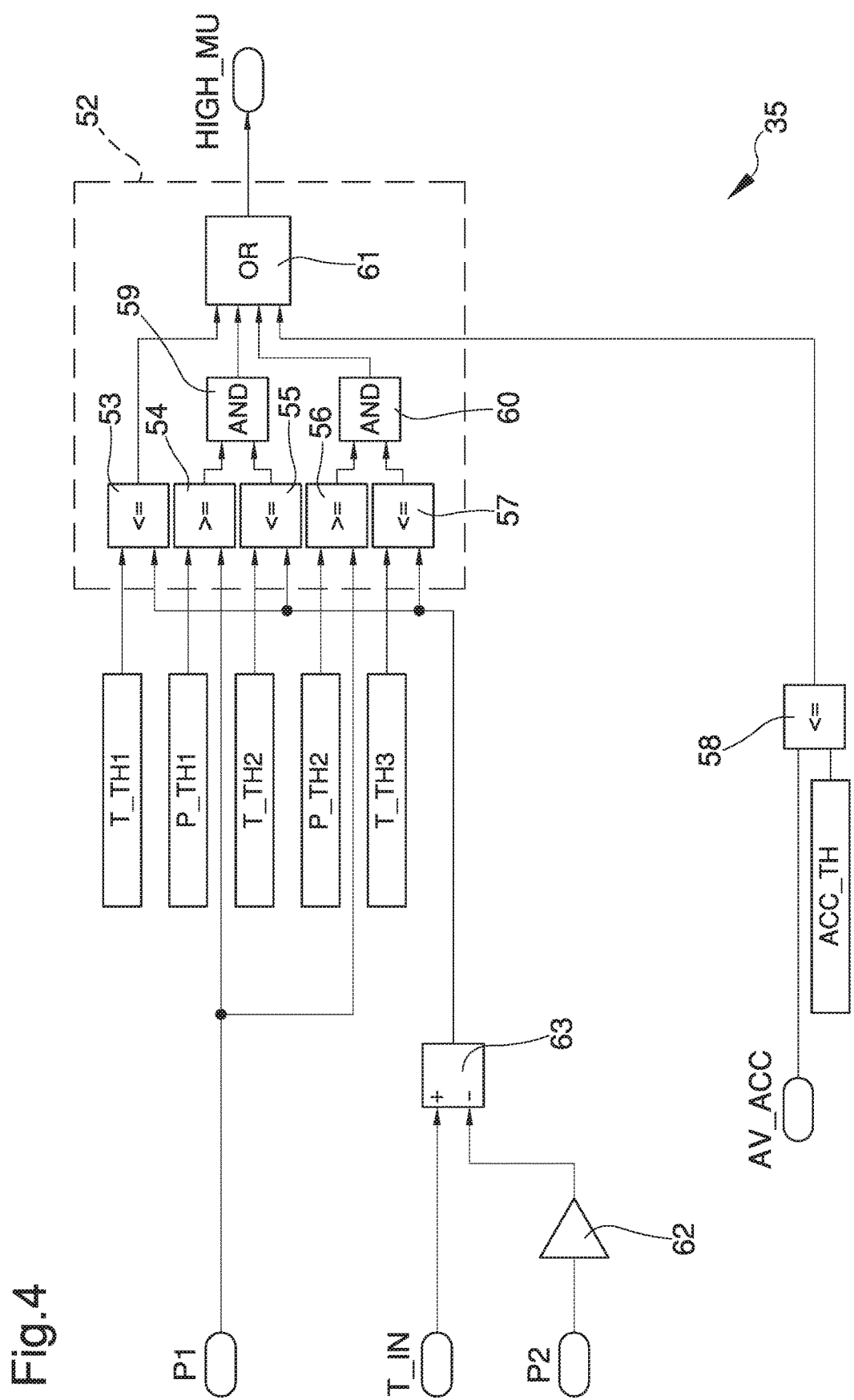
FIG. 4 is a block diagram that illustrates a possible embodiment of a first detecting unit of the wheel anti-lock system of the electric motorcycle according to the invention.

A possible embodiment of the first detecting unit 35 is schematically illustrated in FIG. 4. In particular, the first detecting unit 35 comprises first comparison means 52 able to compare at least the average acceleration value AV_ACC, the pressure value P1 of the front brake and the instantaneous torque value T_IN with respective predefined threshold values P_TH1, P_TH2, T_TH1, T_TH2, T_TH3, ACC_TH.

Specifically, these threshold values may comprise: a first pressure threshold value P_TH1, a second pressure threshold value P_TH2, a first torque threshold value T_TH1, a second torque threshold value T_TH2, a third torque threshold pressure value T_TH3, an acceleration threshold value ACC_TH.

In this regard, it should be noticed that the torque threshold values T_TH1, T_TH2 and T_TH3 are negative torque values.

For example, possible values attributable to the predefined threshold values are the following:

P_TH1=14.5 bars;
P_TH2=11 bars;
T_TH1=−43 Newton meter;
T_TH2=−33 Newton meter;
T_TH3=−21 Newton meter;
ACC_TH=−8.5 m/s$^2$.

It is however pointed out that these parameters are determined according to the specific characteristics of the electric motorcycle M. The use of different threshold values cannot therefore be ruled out.

In particular, the first detecting unit 35 is able to detect a high friction condition HIGH_MU in the case at least one of the following conditions occurs:

T_IN≤T_TH1;
T_IN≤T_TH2 and P1≥P_TH1;
T_IN≤T_TH3 and P1≥P_TH2;
AV_ACC≤ACC_TH.

Conveniently, as illustrated in the preferred embodiment of FIG. 4, in the case the pressure value P2 of the rear brake is also considered, the high friction condition HIGH_MU occurs if at least one of the following conditions is present:

T_IN−(P2×Gp)≤T_TH1;
T_IN−(P2×Gp)≤T_TH2 and P1≥P_TH1;
T_IN−(P2×Gp)≤T_TH3 and P1≥P_TH2;
AV_ACC≤ACC_TH.

where Gp is a normalization factor determined according to the specific characteristics of the rear brake and of the rear wheel (e.g. pad size, disc diameter, wheel diameter).

With particular reference to the embodiment illustrated in FIG. 4, the first comparison means 52 comprise:

a first comparison unit 53 able to check if T_IN−(P2×Gp)≤T_TH1;
a second comparison unit 54 able to check if P1≥P_TH1;
a third comparison unit 55 able to check if T_IN−(P2×Gp)≤T_TH2;
a fourth comparison unit 56 able to check if P1≥P_TH2;
a fifth comparison unit 57 able to check if T_IN−(P2×Gp)≤TH3;
a sixth comparison unit 58 able to check if AV_ACC≤ACC_TH.

The first comparison means 52 also comprise:

a first verification unit 59 able to verify the truth of both conditions at output from the second comparison unit 54 and from the third comparison unit 55;
a second verification unit 60 able to verify the truth of both conditions at output from the fourth comparison unit 56 and from the fifth comparison unit 57;
a third verification unit 61 able to verify the truth of at least one of the conditions at output from the first comparison unit 53 and from the sixth comparison unit 58, from the first verification unit 59 and from the second verification unit 60.

Finally, the first detecting unit 36 comprises a multiplication unit 62 for multiplying the pressure value P2 of the rear brake by the normalization factor Gp, and a subtraction unit 63 for subtracting the output of the multiplication unit 62 from the instantaneous torque value T_IN.

Furthermore, the verification means 20 comprise a second detecting unit 36 able to detect a low friction condition LOW_MU according to the pressure value P1 of the front brake of the electric motorcycle M and to the instantaneous torque value T_IN.

Preferably, the second detecting unit 36 is able to also detect such low friction condition LOW_MU according to the pressure value P2 of the rear brake of the electric motorcycle M. In particular, this way, more effective detection can be obtained of the low friction condition LOW_MU.

Figure 5:
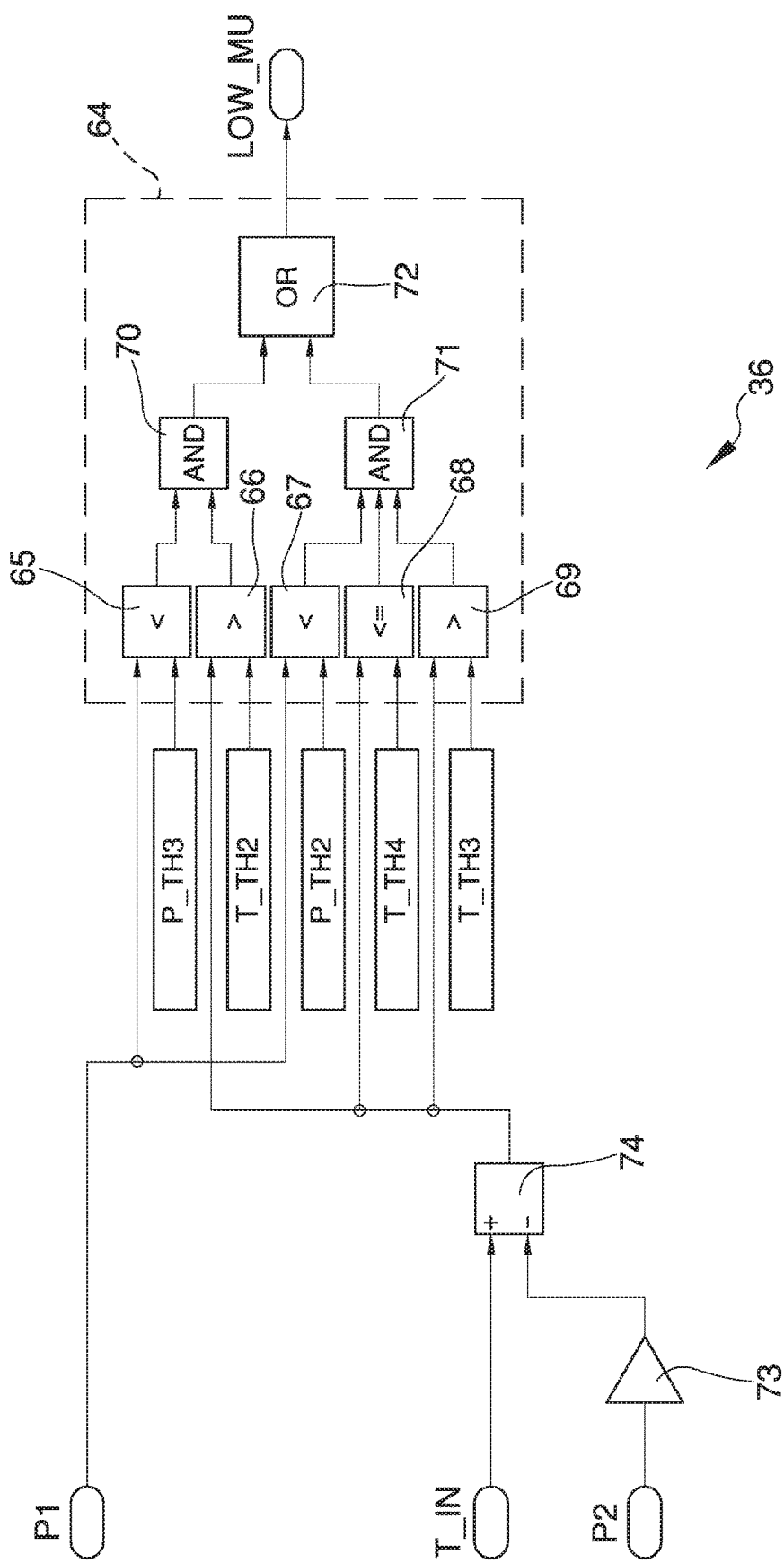
FIG. 5 is a block diagram that illustrates a possible embodiment of a second detecting unit of the wheel anti-lock system of the electric motorcycle according to the invention.

A possible embodiment of the second detecting unit 36 is shown schematically in FIG. 5. In particular, the second detecting unit 36 comprises second comparison means 64 able to compare at least the pressure value P1 of the front brake and the instantaneous torque value T_IN with respective predefined threshold values P_TH2, P_TH3, T_TH2, T_TH3, T_TH4. Specifically, these threshold values may comprise: a second pressure threshold value P_TH2, a third pressure threshold value P_TH3, a second torque threshold value T_TH2, a third torque threshold value T_TH3, a fourth torque threshold pressure value T_TH4. In this regard, it should be noticed that the torque threshold values T_TH2, T_TH3 and T_TH4 are negative torque values.

For example, possible values attributable to the predefined threshold values are the following:

P_TH2=11 bars;
P_TH3=7 bars;
T_TH2=−33 Newton meter;
T_TH3=−21 Newton meter;
T_TH4=−16.5 Newton meter.

It is however pointed out that these parameters are determined according to the specific characteristics of the electric motorcycle M. The use of different threshold values cannot therefore be ruled out.

In particular, the second detecting unit 36 is able to detect a low friction condition LOW_MU in case at least one of the following conditions occurs:

P1<P_TH2 and T_IN>T_TH2
P1<P_TH3 and T_TH3<T_IN≤T_TH4.

Conveniently, with reference to the embodiment of FIG. 5, if also the pressure value P2 of the rear brake is considered, the low friction condition LOW_MU occurs in case at least one of the following conditions is present:

P1<P_TH2 and T_IN−(P2×Gp)>T_TH2
P1<P_TH3 and T_TH3<T_IN−(P2×Gp)≤T_TH4.

where Gp is a normalization factor determined according to the specific characteristics of the rear brake and of the rear wheel (e.g. pad size, disc diameter, wheel diameter).

With particular reference to the embodiment illustrated in FIG. 5, the second comparison means 64 comprise:
- a first comparison unit 65 able to check if P1<P_TH2;
- a second comparison unit 66 able to check if T_IN−(P2× Gp)>T_TH2;
- a third comparison unit 67 able to check if P1<P_TH3;
- a fourth comparison unit 68 able to check if T_IN−(P2× Gp)≤T_TH4;
- a fifth comparison unit 69 able to check if T_TH3<T_IN− (P2×Gp).

The second comparison means 64 also comprise:
- a first verification unit 70 able to verify the truth of both conditions at output from the first comparison unit 65 and from the second comparison unit 66;
- a second verification unit 71 able to verify the truth of both conditions at output from the third comparison unit 67, from the fourth comparison unit 69 and from the fifth comparison unit 69;
- a third verification unit 72 able to verify the truth of at least one of the conditions at output from the first verification unit 70 and from the second verification unit 71.

Finally, the second detecting unit 36 comprises a multiplication unit 73 for multiplying the pressure value P2 of the rear brake by the normalization factor Gp, and a subtraction unit 74 for subtracting the output of the multiplication unit 73 from the instantaneous torque value T_IN.

Figure 6:
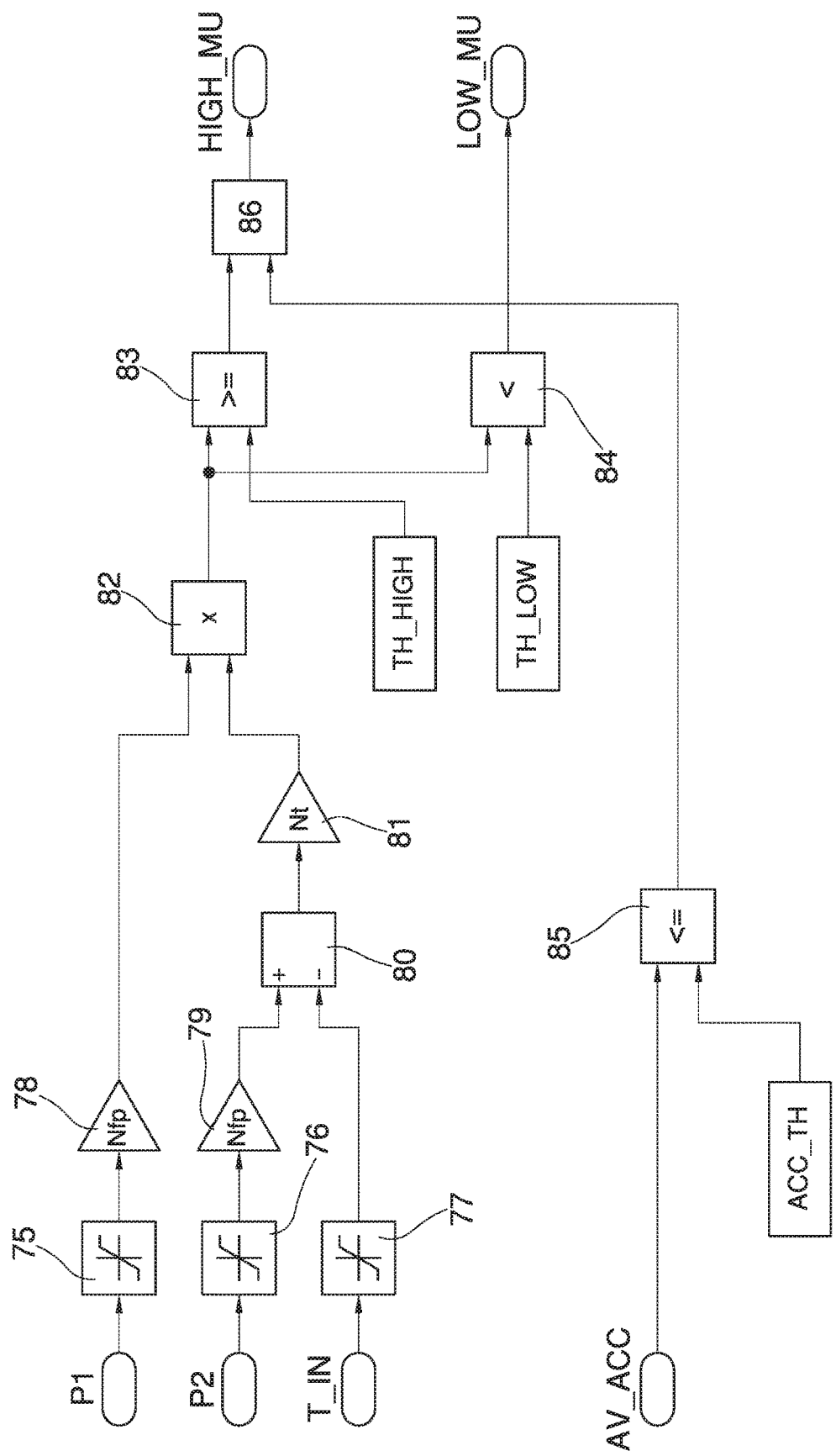
FIG. 6 is a block diagram that illustrates a possible alternative embodiment of a first detecting unit and of a second detecting unit of the wheel anti-lock system of the electric motorcycle according to the invention.

By way of example, FIG. 6 shows a possible alternative embodiment of the first and second detecting units 35 and 36. More specifically, in this case the first and second detecting units 35 and 36 are made by means of a single logic circuit.

In particular, several limiting units 75, 76, 77 are able to receive at input and limit the maximum and minimum values of the pressure value P1 of the front brake, of the pressure value P2 of the rear brake and of the torque value T_IN respectively.

A subtraction unit 80 is able to subtract the torque value T_IN (which is a negative torque value) from the pressure value P2 of the rear brake.

Usefully, respective normalization units 78, 79, 81 are able to multiply the pressure value P1 of the front brake, the pressure value P2 of the rear brake and the value at output from the subtraction unit 80 by respective normalization factors Nfp, Nrp and Nt. Such normalization factors depend on the dynamics of the vehicle and are determined by experimental tests.

A multiplication unit 82 is able to multiply together the pressure value P1 of the front brake and the value at output from the subtraction unit 80.

A first comparison unit 83 is able to check whether the signal at output from the multiplication unit 82 is greater than or equal to a maximum threshold value TH_HIGH. In this case, a high friction condition HIGH_MU occurs.

A second comparison unit 84 is able to check whether the signal at output from the multiplication unit 82 is lower than a minimum threshold value TH_LOW. In this case, a low friction condition LOW_MU occurs.

Furthermore, a third comparison unit 85 is able to check whether the average acceleration value AV_ACC is lower than or equal to an acceleration threshold value ACC_TH.

In particular, a verification unit 86 is able to check whether there is at least one of the conditions at output from the multiplication unit 82 and from the third comparison unit 85. In conclusion, then, according to the logic diagram shown in FIG. 6 it is possible to detect the presence of a high friction condition HIGH_MU when at least one of the following conditions is present:

(P1×(P2−T_IN))≥TH_HIGH;
AV_ACC≤ACC_TH.

Similarly, according to the logic diagram shown in FIG. 6 it is possible to detect the presence of a low friction condition LOW_MU when: (P1×(P2−T_IN))≤TH_LOW.

Usefully, a debounce circuit 37 is arranged downstream of the first and of the second detecting units 35 and 36 and is connected to the limiting means 19. In particular, such debounce circuit 37 allows maintaining the outputs stable in the presence of variations of the inputs with duration lower than a predefined time interval. For example, such predefined time interval may be equal to 2 seconds.

Figure 7:
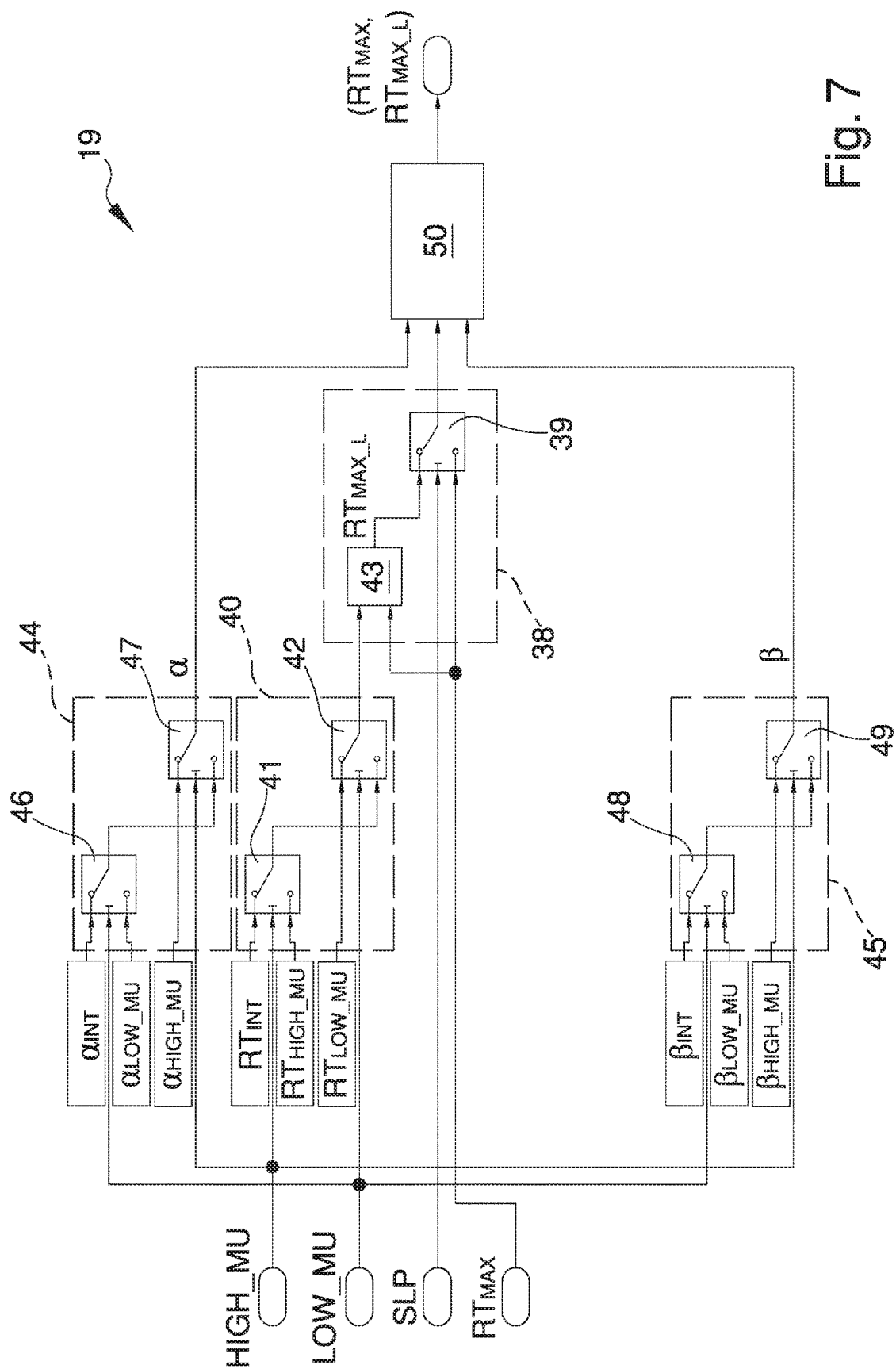
FIG. 7 is a block diagram that illustrates in detail the limiting means of the system of FIG. 3.

FIG. 7 shows in detail a possible embodiment of the limiting means 19.

Advantageously, the limiting means 19 comprise first selection means 38 between:
- the maximum regeneration torque value $RT_{MAX}$ in the absence of slippage condition SLP;
- a limited torque value $RT_{MAX\_L}$ in the presence of the slippage condition SLP.

The first selection means 38 comprise, e.g., a first selector element 39 able to receive at input the maximum regeneration torque value $RT_{MAX}$, the limited torque value $RT_{MAX\_L}$ and the slippage condition value SLP (preferably made up of a binary value 0 or 1). The first selector element 39 then returns at output the maximum regeneration torque value $RT_{MAX}$ or the limited torque value $RT_{MAX\_L}$ according to the detected slippage condition SLP. Advantageously, still according to the preferred embodiment shown in FIG. 4, the limited torque value $RT_{MAX\_L}$ can be selected according to the detected high friction condition HIGH_MU or low friction condition LOW_MU.

For this purpose, the limiting means 19 comprise second selection means 40 operatively connected to the first selection means 38 and able to select the limited torque value $RT_{MAX\_L}$ between:
- a high friction torque value $RT_{HIGH\_MU}$ in case of the presence of the high friction condition HIGH_MU;
- a low friction torque value $RT_{LOW\_MU}$ in case of the presence of said low friction condition LOW_MU;
- an indeterminate friction torque value $RT_{INT}$ in case of the absence of both the high friction condition HIGH_MU and the low friction condition LOW_MU.

In particular, the second selection means 40 comprise at least a second selector element 41 able to receive at input the high friction torque value $RT_{HIGH\_MU}$, the indeterminate friction torque value $RT_{INT}$ and the high friction condition value HIGH_MU (preferably made up of a binary value 0 or 1). The second selector element 41 returns at output the high friction torque value $RT_{HIGH\_MU}$ or the indeterminate friction torque value $RT_{INT}$ according to the presence or not of the high friction condition HIGH_MU.

Furthermore, the second selection means 40 comprise a third selector element 42 able to receive at input the low friction torque value $RT_{LOW\_MU}$, the torque value at output from the second selector element 41 and the low friction condition value LOW_MU (preferably made up of a binary value 0 or 1). The third selector element 42 returns at output the low friction torque value $RT_{LOW\_MU}$ or the torque value at output from the second selector element 41 according to the presence or not of the low friction condition LOW_MU.

Usefully, the first selection means 38 are connected downstream of the third selector element 42 and comprise a comparison element 43 able to select the lower between the maximum regeneration torque value $RT_{MAX}$ and the torque value at output from the third selector element 42.

Advantageously, the limiting means 19 comprise third selection means 44, 45 for the selection of the angles of variation of the torque value over time.

In particular, according to the preferred embodiment illustrated in FIG. 4, the third selection means 44, 45 comprise a first selection block 44 of a first variation angle α from the maximum regeneration torque value $RT_{MAX}$ to the limited torque value $RT_{MAX\_L}$ between:

a first high friction angle $\alpha_{HIGH\_MU}$ in case of the presence of the high friction condition HIGH_MU;

a first low friction angle $\alpha_{LOW\_MU}$ in case of the presence of the low friction condition LOW_MU;

a first indeterminate friction angle $\alpha_{INT}$ in case of the absence of both the high friction condition HIGH_MU and the low friction condition LOW_MU.

In addition, the third selection means 44, 45 comprise a second selection block 45 of a second variation angle β from the limited torque value $RT_{MAX\_L}$ to the maximum regeneration torque value $RT_{MAX}$ between:

a second high friction angle $\beta_{HIGH\_MU}$ in case of the presence of the high friction condition HIGH_MU;

a second low friction angle $\beta_{LOW\_MU}$ in case of the presence of the low friction condition LOW_MU;

a second indeterminate friction angle $\beta_{INT}$ in case of the absence of both the high friction condition HIGH_MU and the low friction condition LOW_MU.

In particular, the first selection block 44 has a fourth selector element 46 able to receive at input the value of the first low friction angle $\alpha_{LOW\_MU}$, the value of the first indeterminate friction angle $\alpha_{INT}$ and the low friction condition value LOW_MU (preferably made up of a binary value 0 or 1). The fourth selector element 44 returns at output the value of the first low friction angle $\alpha_{LOW\_MU}$ or the value of the first indeterminate friction angle $\alpha_{INT}$ according to the presence or not of the low friction condition LOW_MU.

Furthermore, the first selection block 44 has a fifth selector element 47 able to receive at input the value of the first high friction angle $\alpha_{HIGH\_MU}$, the value at output from the fourth selector element 46 and the high friction condition value HIGH_MU (preferably made up of a binary value 0 or 1). The fifth selector element 47 returns at output the value of the first high friction angle $\alpha_{HIGH\_MU}$ or the value at output from the fourth selector element 46 according to the presence or not of the high friction condition HIGH_MU.

Similarly, the second selection block 45 has a sixth selector element 48 able to receive at input the value of the second low friction angle $\beta_{LOW\_MU}$, the value of the second indeterminate friction angle $\beta_{INT}$ and the low friction condition value LOW_MU (preferably made up of a binary value 0 or 1). The sixth selector element 48 returns at output the value of the second low friction angle $\beta_{LOW\_MU}$ or the value of the second indeterminate friction angle $\beta_{INT}$ according to the presence or not of the low friction condition LOW_MU. Moreover, the second selection block 45 has a seventh selector element 49 able to receive at input the value of the second high friction angle $\beta_{HIGH\_MU}$, the value at output from the sixth selector element 48 and the high friction condition value HIGH_MU (preferably made up of a binary value 0 or 1). The seventh selector element 49 returns at output the value of the second high friction angle $\beta_{HIGH\_MU}$ or the value at output from the sixth selector element 48 according to the presence or not of the high friction condition HIGH_MU.

Figure 8:
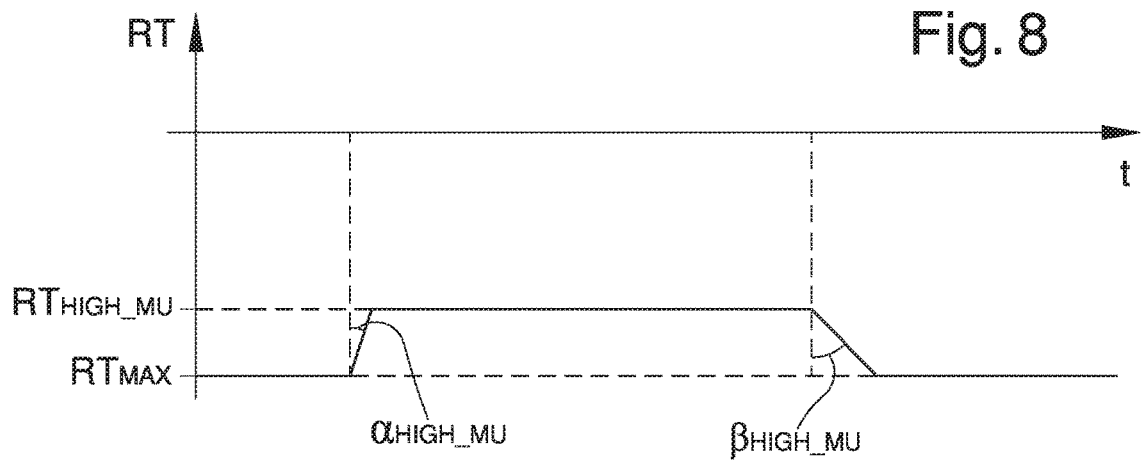
FIGS. 8, 9 and 10 illustrate possible trends in different friction conditions of the maximum regeneration torque and the maximum limited torque obtained by means of the wheel anti-lock system of the electric motorcycle according to the invention.
Figure 9:
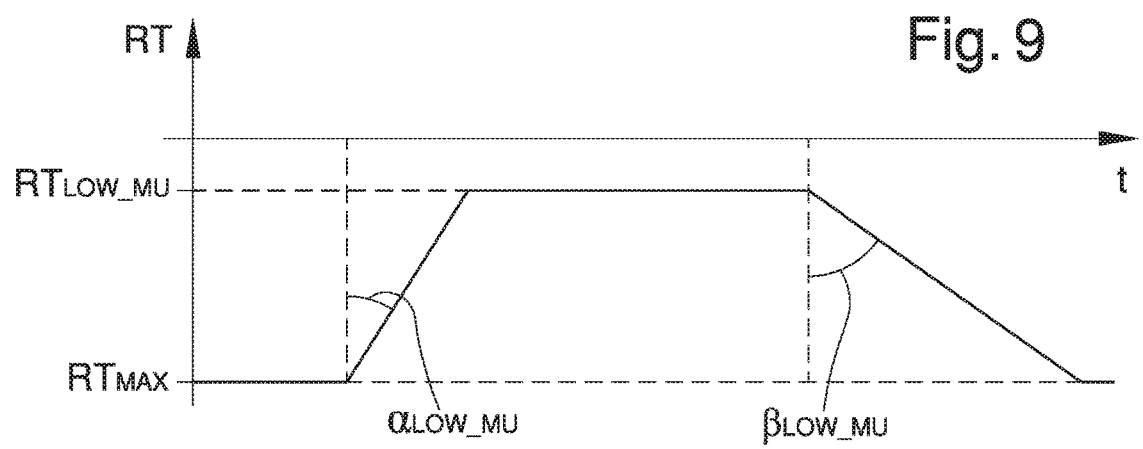
Figure 10:
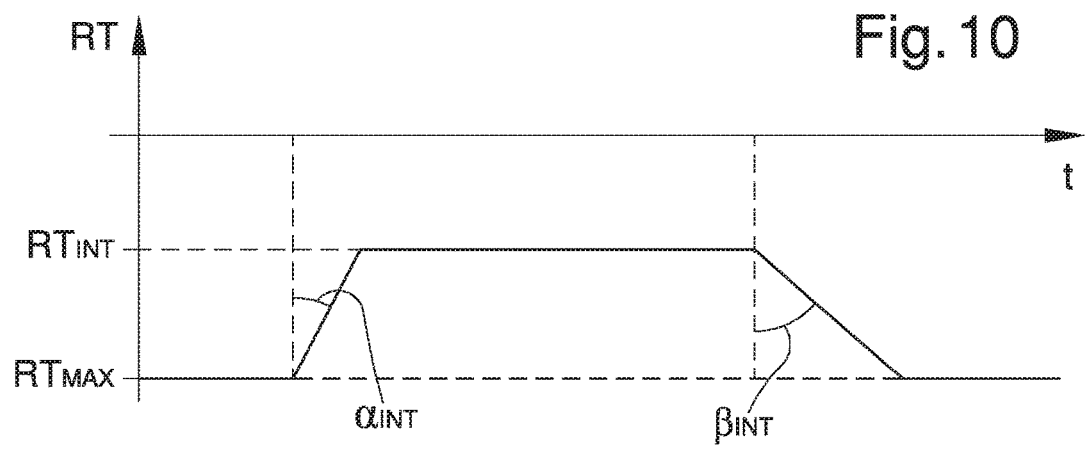

The limiting means 19 also comprise a torque variation unit 50 operatively connected to the output of the first selector element 39, to the output of the fifth selector element 47 and to the output of the seventh selector element 49 and able to vary over time the torque value at output between the maximum regeneration torque $RT_{MAX}$ and the limited torque value $RT_{MAX\_L}$, according to the selected first variation angle α and the second variation angle β. In FIGS. 8, 9 and 10 are illustrated, by way of example, possible trends of the maximum limited torque $RT_{MAX\_L}$ according to the friction conditions.

Specifically, in FIG. 8 is illustrated a possible trend of the maximum limited torque $RT_{MAX\_L}$ in high friction conditions HIGH_MU, in which the maximum limited torque $RT_{MAX\_L}$ has an amplitude equal to the high friction torque value $RT_{HIGH\_MU}$ and varies from and to the maximum regeneration torque value $RT_{MAX}$ with a first high friction angle $\alpha_{HIGH\_MU}$ and with a second high friction angle $\beta_{HIGH\_MU}$, respectively.

FIG. 9 shows a possible trend of the maximum limited torque $RT_{MAX\_L}$ in low friction conditions LOW_MU, in which the maximum limited torque $RT_{MAX\_L}$ has an amplitude equal to the low friction torque value $RT_{LOW\_MU}$ and varies from and to the maximum regeneration torque value $RT_{MAX}$ with a first low friction angle $\alpha_{LOW\_MU}$ and with a second low friction angle $\beta_{LOW\_MU}$, respectively.

Finally, FIG. 10 shows a possible trend of the maximum limited torque $RT_{MAX\_L}$ in an indeterminate friction condition, when none of the high friction condition HIGH_MU or low friction condition LOW_MU occur, wherein the maximum limited torque $RT_{MAX\_L}$ has an amplitude equal to the indeterminate friction torque value $RT_{INT}$ and varies from and to the maximum regeneration torque value $RT_{MAX}$ with a first indeterminate friction angle $\alpha_{INT}$ and a second indeterminate friction angle $\beta_{INT}$, respectively.

In particular, such indeterminate condition occurs in the case in which the first and second detecting units 35 and 36 are not able to provide a univocal result, e.g., in the case in which the locking condition is in an intermediate friction speed or for reasons due to the connection of the road surface or the vehicle dynamics. Therefore, the system 1 provides for such indeterminate condition to meet all those situations where, in fact, it is not possible to determine unambiguously the coefficient of friction.

In this regard, moreover, it is pointed out that according to the particular solution shown in FIG. 10, the indeterminate friction torque $RT_{INT}$, the first indeterminate friction angle $\alpha_{INT}$ and the second indeterminate friction angle $\beta_{INT}$ have values which are intermediate with respect to the torque values $RT_{HIGH\_MU}$ and $RT_{LOW\_MU}$ and to the values of angles $\alpha_{HIGH\_MU}$, $\beta_{HIGH\_MU}$, $\alpha_{LOW\_MU}$ and $\beta_{LOW\_MU}$ used in high friction HIGH_MU and low friction LOW_MU conditions.

The use cannot however be ruled out of different values in indeterminate friction conditions. In particular, it is pointed out that the values attributable to the high friction torque value $RT_{HIGH\_MU}$, to the low friction torque value $RT_{LOW\_MU}$, to the indeterminate friction torque value $RT_{INT}$, to the first high friction angle $\alpha_{HIGH\_MU}$, to the second high friction angle $\beta_{HIGH\_MU}$, to the first low friction angle $\alpha_{LOW\_MU}$, to the second low friction angle $\beta_{LOW\_MU}$, to the first indeterminate friction angle $\alpha_{INT}$ and to the second indeterminate friction angle $\beta_{INT}$ depend on the specific characteristics of the electric motorcycle M.

For example, possible values attributable to these angles are the following:

$RT_{HIGH\_MU}$=22 Newton meter;
$RT_{LOW\_MU}$=10 Newton meter;
$RT_{INT}$=17 Newton meter;
$\alpha_{HIGH\_MU}$=140 Newton meter per second;
$\beta_{HIGH\_MU}$=50 Newton meter per second;
$\alpha_{LOW\_MU}$=100 Newton meter per second;
$\beta_{LOW\_MU}$=30 Newton meter per second;
$\alpha_{INT}$=120 Newton meter per second;
$\beta_{INT}$=40 Newton meter per second.

It has in practice been ascertained how the described invention achieves the intended objects.

In particular the fact is underlined that the wheel anti-lock system according to the invention allows avoiding the locking of the wheels of an electric motorcycle even after vehicle deceleration caused by the braking action of the electric motor of the motorcycle, during an electric battery regeneration phase.

What is claimed is:

1. Electric motorcycle (M), comprising a support frame, a rear wheel (RW), a front wheel (FW), an electric propulsion motor (E), an electronic control unit (2) for driving said electric motor (E) and a wheel anti-lock system (1) operatively connected to said control unit (2), said system (1) having detection means (18) of a slippage condition (SLP) of at least one of said wheels (RW, FW) and limiting means (19) operatively connected to said detection means (18), able to receive at input at least a value of maximum regeneration torque ($RT_{MAX}$) of the electric motor (E) of said electric motorcycle (M) and able to limit said maximum regeneration torque ($RT_{MAX}$) in case of detection of said slippage condition (SLP), wherein said system (1) comprises verification means (20) of the friction conditions of said wheels (RW, FW) on the road surface, in order to verify the presence or not of a high friction condition (HIGH_MU) or a low friction condition (LOW_MU), wherein said limiting means (19) are operatively connected to said verification means (20) and, in case of detection of said slippage condition (SLP), are able to limit said maximum regeneration torque ($RT_{MAX}$) according to said high friction (HIGH_MU) or low friction (LOW_MU) condition, and wherein said verification means (20) of the friction conditions comprise:

at least a first detection unit (35) able to detect said high friction condition (HIGH_MU) according to at least an acceleration value (AV_ACC), a pressure value (P1) of a front brake of said electric motorcycle (M) and an instantaneous torque value (T_IN) of said electric motor (E);

at least a second detection unit (36) able to detect said low friction condition (LOW_MU) according to at least a pressure value (P1) of a front brake of said electric motorcycle (M) and an instantaneous torque value (T_IN) of said electric motor (E); wherein said first detection unit (35) comprises first comparison means (52) able to compare at least said acceleration value (AV_ACC), said pressure value (P1) of the front brake and said instantaneous torque value (T_IN) with respective predefined threshold values (P_TH1, P_TH2, T_TH1, T_TH2, T_TH3, ACC_TH);

wherein said second detection unit (36) comprises second comparison means (64) able to compare at least said pressure value (P1) of the front brake and said instantaneous torque value (T_IN) with respective predefined threshold values (P_TH2, P_TH3, T_TH2, T_TH3, T_TH4).

2. Electric motorcycle (M) according to claim 1, wherein said first detection unit (35) is able to detect said high friction condition (HIGH_MU) also according to a pressure value (P2) of a rear brake of said electric motorcycle (M).

3. Electric motorcycle (M) according to claim 1, wherein said second detection unit (36) is able to detect said low friction condition (LOW_MU) also according to a pressure value (P2) of a rear brake of said electric motorcycle (M).

4. Electric motorcycle (M) according to claim 1, wherein said detection means (18) comprise at least a first calculation unit (21) of a speed difference ($\Delta V$) between the front wheel (FW) and the rear wheel (RW) of said electric motorcycle (M), starting from at least an instantaneous speed value (F_SPD) of the front wheel (FW) and from at least an instantaneous speed value (R_SPD) of the rear wheel (RW).

5. Electric motorcycle (M) according to claim 4, wherein said detection means (18) comprise at least a comparison unit (24) between said speed difference ($\Delta V$) and at least a predefined threshold value (SPD_TH), in which:

if said speed difference ($\Delta V$) is greater than said threshold value (SPD_TH), then there is said slippage condition (SLP);

if said speed difference ($\Delta V$) is lower than said threshold value (SPD_TH), then there isn't said slippage condition (SLP).

6. Electric motorcycle (M) according to claim 5, wherein said detection means (18) comprise calculation means (25, 26) of said threshold value (SPD_TH) according to at least one of said instantaneous speed (F_SPD) of the front wheel (FW) and said instantaneous speed (R_SPD) of the rear wheel (RW).

7. Electric motorcycle (M) according to claim 5, wherein said detection means (18) comprise at least a calibration unit (27) of said speed difference ($\Delta V$) operatively interposed between said first calculation unit (21) and said comparison unit (24), able to receive at input said speed difference ($\Delta V$) and at least a calibration value (SPD_CAL) and to return at output a calibrated speed difference ($\Delta V_c$).

8. Electric motorcycle (M) according to claim 7, wherein said motorcycle (M) comprises determination means (28) of said calibration value (SPD_CAL) according to said instantaneous torque value (T_IN) of said electric motor (E) and at least a value of said speed difference ($\Delta V$).

9. Electric motorcycle (M) according to claim 1, wherein said verification means (20) of the friction condition comprise at least a derivation unit (32) able to calculate at least an acceleration value (F_ACC) of said front wheel (FW) and an acceleration value (R_ACC) of said rear wheel (RW) according to at least an instantaneous speed value (F_SPD) of said front wheel (FW) and to at least an instantaneous speed value (R_SPD) of said rear wheel (RW).

10. Electric motorcycle (M) according to claim 9, wherein said verification means (20) of the friction conditions comprise at least a determination unit (34) of an average acceleration value (AV_ACC) starting from said acceleration value (F_ACC) of the front wheel (FW) and from said acceleration value (R_ACC) of the rear wheel (RW).

11. Electric motorcycle (M) according to claim 1, wherein said limiting means (19) comprise first selection means (38) to select:

said maximum regeneration torque ($RT_{MAX}L$) in case of absence of said slippage condition (SLP);

at least a limited torque value ($RT_{MAX}\_L$) in case of presence of said slippage condition (SLP).

12. Electric motorcycle (M) according to claim 11, wherein said limiting means (19) comprise second selection means (40) operatively connected to said first selection means (38) to select said limited torque value ($RT_{MAX}\_L$) among:

at least a high friction torque value ($RT_{HIGH}\_MU$) in case of the presence of said high friction condition (HIGH_MU);

at least a low friction torque value ($RT_{LOW}\_MU$) in case of the presence of said low friction condition (LOW_MU);

at least an indeterminate friction torque value ($RT_{INT}$) in case of the absence of both said high friction condition (HIGH_MU) and said low friction condition (LOW_MU).

13. Electric motorcycle (M) according to claim 11, wherein said limiting means (19) comprise third selection means (44, 45) to select at least a variation angle ($\alpha, \beta$) of said limited torque value ($RT_{MAX}\_L$) in the time among:

at least a high friction angle ($\alpha_{HIGH}\_MU, \beta_{HIGH}\_MU$) in case of the presence of said high friction condition (HIGH_MU);

at least a low friction angle ($\alpha_{LOW}\_MU, \beta_{LOW}\_MU$) in case of the presence of said low friction condition (LOW_MU);

at least an indeterminate friction angle ($\alpha_{INT}, \beta_{INT}$) in case of the absence of both said high friction condition (HIGH_MU) and said low friction condition (LOW_MU).

14. Electric motorcycle (M) according to claim 13, wherein said limiting means (19) comprise at least a torque variation unit (50) operatively connected at least to said first selection means (38) and to said third selection means (44, 45) and able to vary the torque value at output between said maximum regeneration torque ($RT_{MAX}$) and said limited torque value ($RT_{MAX}\_L$) according to said at least a variation angle in the time selected by said third selection means.

\* \* \* \* \*